(12) United States Patent
Chen

(10) Patent No.: US 10,722,953 B1
(45) Date of Patent: Jul. 28, 2020

(54) CNC MILLING MACHINE COMBINED WITH PICKING ROBOTIC ARM UNIT

(71) Applicant: Feng-Tien Chen, Taichung (TW)

(72) Inventor: Feng-Tien Chen, Taichung (TW)

( * ) Notice: Subject to any disclaimer, the term of this patent is extended or adjusted under 35 U.S.C. 154(b) by 0 days.

(21) Appl. No.: 16/252,535

(22) Filed: Jan. 18, 2019

(51) Int. Cl.
| | |
|---|---|
| *B23Q 5/34* | (2006.01) |
| *B23Q 7/04* | (2006.01) |
| *B23C 1/06* | (2006.01) |
| *B23C 1/00* | (2006.01) |
| *B23Q 1/01* | (2006.01) |

(52) U.S. Cl.
CPC ............ *B23C 1/002* (2013.01); *B23Q 1/012* (2013.01); *B23Q 5/34* (2013.01); *B23Q 7/04* (2013.01)

(58) Field of Classification Search
CPC .......... B23C 1/002; B23Q 1/012; B23Q 7/04; B23Q 7/041; B23Q 7/043; B23Q 7/045; B23Q 7/046; B23Q 5/225; B23Q 5/34; B23Q 2707/04; B25J 11/005; B25J 11/0055
See application file for complete search history.

(56) References Cited

U.S. PATENT DOCUMENTS

| | | | | |
|---|---|---|---|---|
| 6,655,884 B2 * | 12/2003 | Ferrari | ........... | B23Q 1/012 408/53 |
| 2003/0138311 A1 * | 7/2003 | Watanabe | ........... | B23Q 1/012 414/749.1 |
| 2004/0090126 A1 * | 5/2004 | Hsu | ........... | B23Q 1/012 310/12.13 |
| 2011/0233879 A1 * | 9/2011 | Tullmann | ........... | B23Q 1/44 279/110 |
| 2013/0039713 A1 * | 2/2013 | Weidman | ........... | B23Q 1/01 409/235 |
| 2014/0165348 A1 * | 6/2014 | Yang | ........... | B23B 3/065 29/56.5 |
| 2019/0084108 A1 * | 3/2019 | Suckert | ........... | B23Q 1/626 |

FOREIGN PATENT DOCUMENTS

| | | | | |
|---|---|---|---|---|
| DE | 2930006 A1 * | 2/1981 | ............ | B23Q 7/043 |
| DE | 19833125 A1 * | 1/2000 | ............ | B23Q 5/34 |
| DE | 102011082839 A1 * | 3/2013 | ............ | B23Q 1/012 |

* cited by examiner

*Primary Examiner* — Ryan C Rufo
(74) *Attorney, Agent, or Firm* — Leong C. Lei

(57) ABSTRACT

A CNC milling machine includes a chassis unit having vertical seats. A machining unit includes a frontward-rearward movable machining seat located on the vertical seats, a leftward-rightward movable machining seat in front of the frontward-rearward movable machining seat, an upward-downward movable machining seat in front of the leftward-rightward movable machining seat, and a machining tool set at a bottom of the upward-downward movable machining seat. A picking robotic arm unit includes a frontward-rearward movable picking seat located on the vertical seats and in front of the frontward-rearward movable machining seat, a leftward-rightward movable picking seat above the frontward-rearward movable picking seat, an upward-downward movable picking seat adjacent to the leftward-rightward movable picking seat, and a claw set at a bottom of the upward-downward movable picking seat. Coupling achieved with a coupling unit allows the picking robotic arm unit to be driven to move by the machining unit.

9 Claims, 12 Drawing Sheets

US 10,722,953 B1

CNC MILLING MACHINE COMBINED WITH PICKING ROBOTIC ARM UNIT

TECHNICAL FIELD OF THE INVENTION

The present invention relates generally to a machine tool, and more particularly to a computer numeric control (CNC) milling machine combined with a picking robotic arm unit.

DESCRIPTION OF THE PRIOR ART

An existing CNC milling machine comprises a machining unit and a picking robotic arm unit that are arranged adjacent to each other. The machining unit comprises a three-axis machining driving module and a machining tool set that is arranged to be operatively driven by the three-axis machining driving unit to move in three mutually perpendicular direction. The picking robotic arm unit comprises a three-axis picking driving module and a claw set that is arranged to be operatively driven by the three-axis picking driving unit to move in three mutually perpendicular direction. The claw set of the picking robotic arm unit is operable to grip and move a work piece and the machining tool set of the machining unit is operable to machine the work piece so that machining can be carried out on the work piece.

However, to achieve movements in three axes, the three-axis machining driving module requires at least three servo motors. The three-axis picking driving module also requires at least three servo motors. These make the cost of the CNC milling machine extremely high.

SUMMARY OF THE INVENTION

Thus, the present invention provides a CNC milling machine that is combinable with a picking robotic arm unit, comprising a chassis unit, a machining unit, a picking robotic arm unit, and a coupling unit.

An X-direction, a Y-direction and a Z-direction, which are mutually perpendicular to each other are so defined that the X-direction is in a front-rear direction, the Y-direction in a left-right direction, and the Z-direction in an up-down direction. The chassis unit comprises two vertical seats spaced from each other in the Y-direction. The machining unit comprises a frontward-rearward movable machining seat arranged on the vertical seats, two frontward-rearward driving sets respectively arranged between the vertical seats and the frontward-rearward movable machining seat and operable to drive the frontward-rearward movable machining seat to move in the X-direction, a leftward-rightward movable machining seat arranged at a front side of the frontward-rearward movable machining seat, a leftward-rightward driving set arranged between the leftward-rightward movable machining seat and the frontward-rearward movable machining seat to drive the leftward-rightward movable machining seat to move in the Y-direction, an upward-downward movable machining seat arranged at a front side of the leftward-rightward movable machining seat, an upward-downward machining driving set arranged between the upward-downward movable machining seat and the leftward-rightward movable machining seat to drive the upward-downward movable machining seat to move in the Z-direction, and a machining tool set arranged at a bottom of the upward-downward movable machining seat.

The picking robotic arm unit comprises a frontward-rearward movable picking seat located at a top side of the vertical seats and located at a front side of the frontward-rearward movable machining seat, two frontward-rearward sliding sets respectively arranged between the vertical seats and the frontward-rearward movable picking seat to allow the frontward-rearward movable picking seat to move in the X-direction, a leftward-rightward movable picking seat arranged at a top side of the frontward-rearward movable picking seat, a leftward-rightward sliding set arranged between the leftward-rightward movable picking seat and the frontward-rearward movable picking seat to allow the leftward-rightward movable picking seat to move in the Y-direction, an upward-downward movable picking seat arranged adjacent to the leftward-rightward movable picking seat, an upward-downward sliding set arranged between the upward-downward movable picking seat and the leftward-rightward movable picking seat to allow the upward-downward movable picking seat to move in the Z-direction, and a claw set arranged at a bottom of the upward-downward movable picking seat. The coupling unit comprises a first coupling member arranged on the upward-downward movable machining seat and extending frontward, a second coupling member arranged on the picking robotic arm unit and extending rearward, and a coupling driving set that is drivable to couple the first coupling member and the second coupling member, wherein the machining unit uses the coupling unit to drive the leftward-rightward movable picking seat and the frontward-rearward movable picking seat to move.

The efficacy of the present invention is that by arranging the machining unit and the picking robotic arm unit on the vertical seats and using the coupling unit to achieve coupling therebetween, the picking robotic arm unit is selectively drivable by the machining unit to move so that the cost can be reduced.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
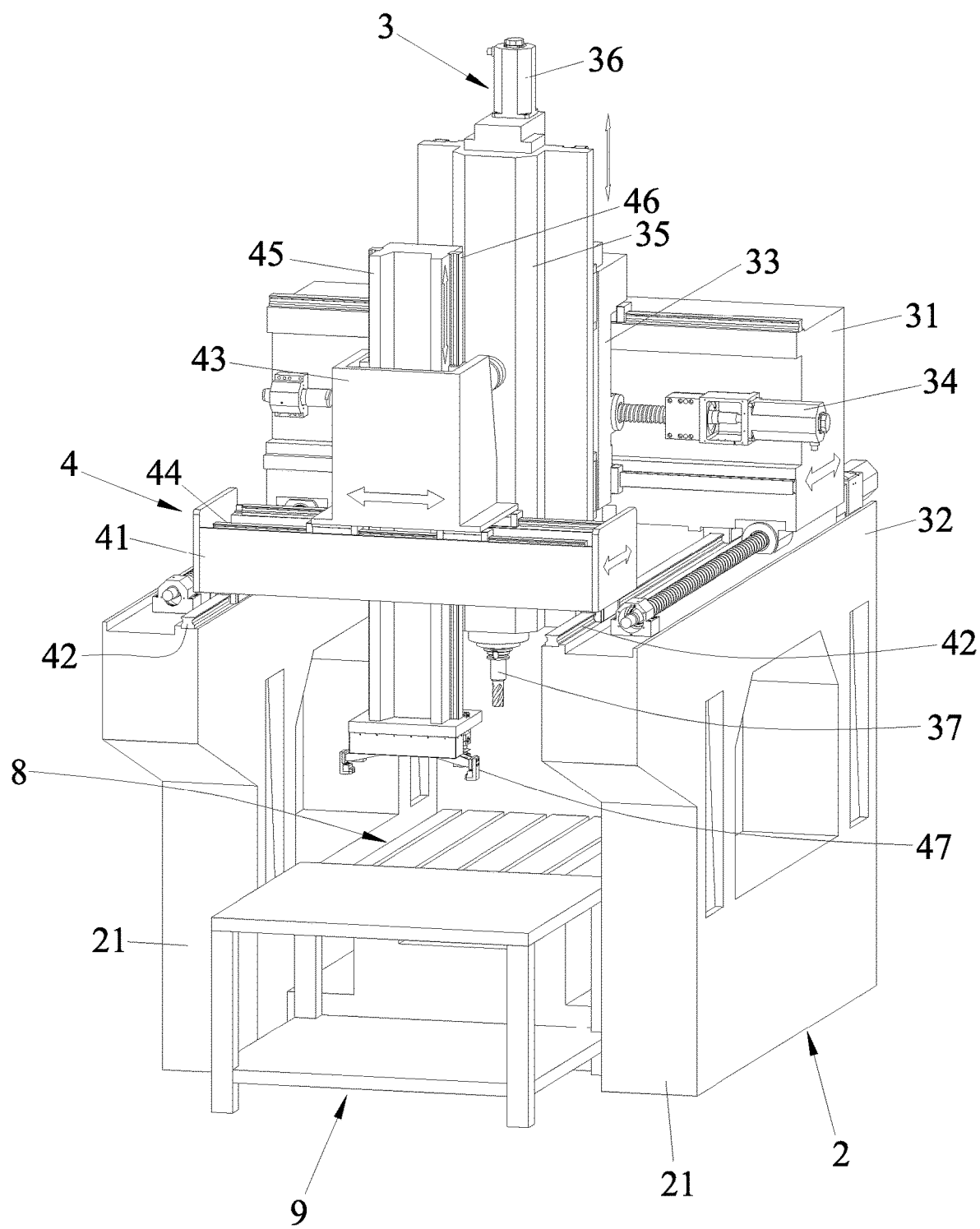
FIG. 1 is a perspective view showing a CNC milling machine combined with a picking robotic arm unit according to a first embodiment the present invention, a machining table, and a picking table.
Figure 2:
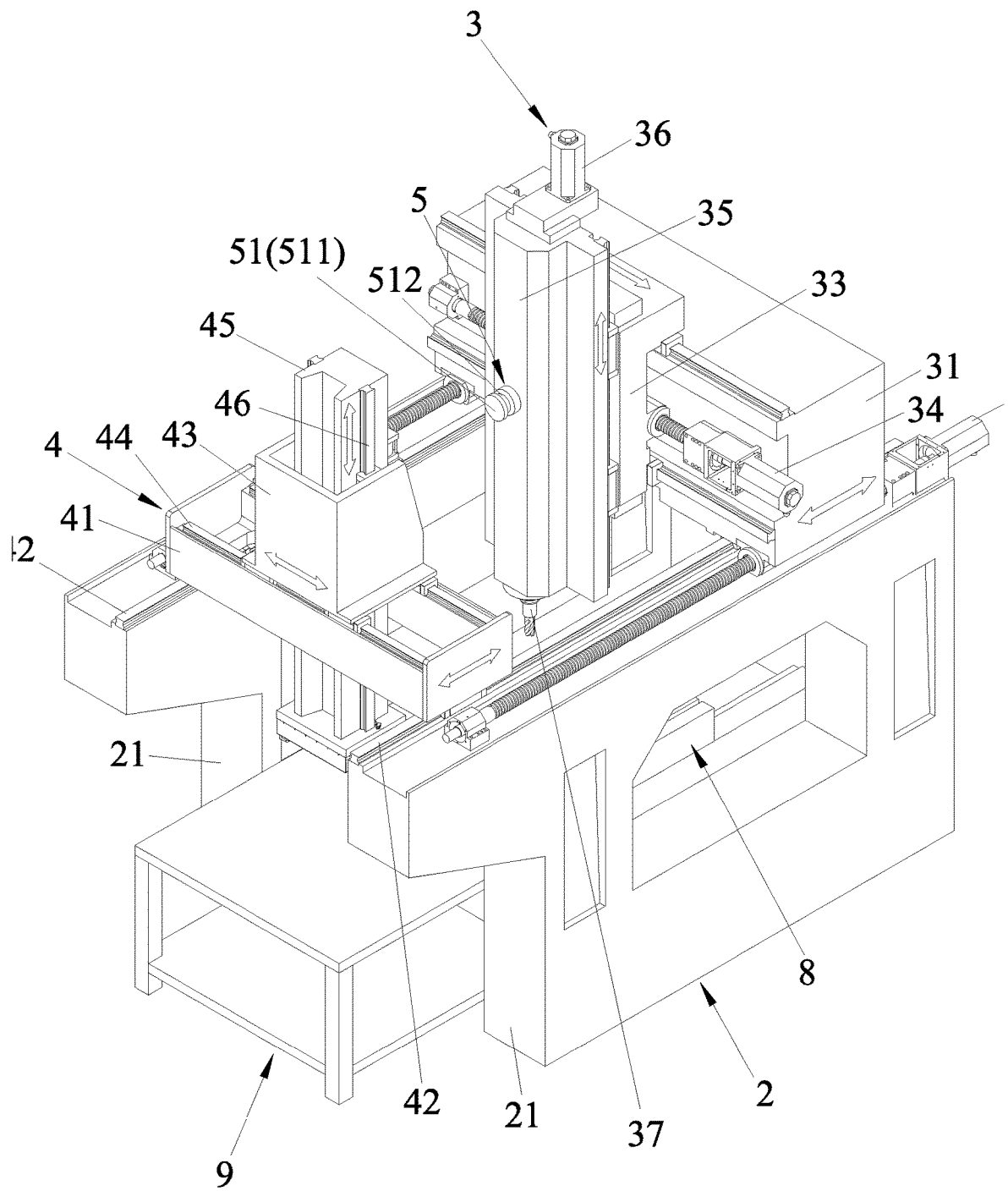
FIG. 2 is a perspective view, taken from a different angle, showing the first embodiment, the machining table, and the picking table.
Figure 3:
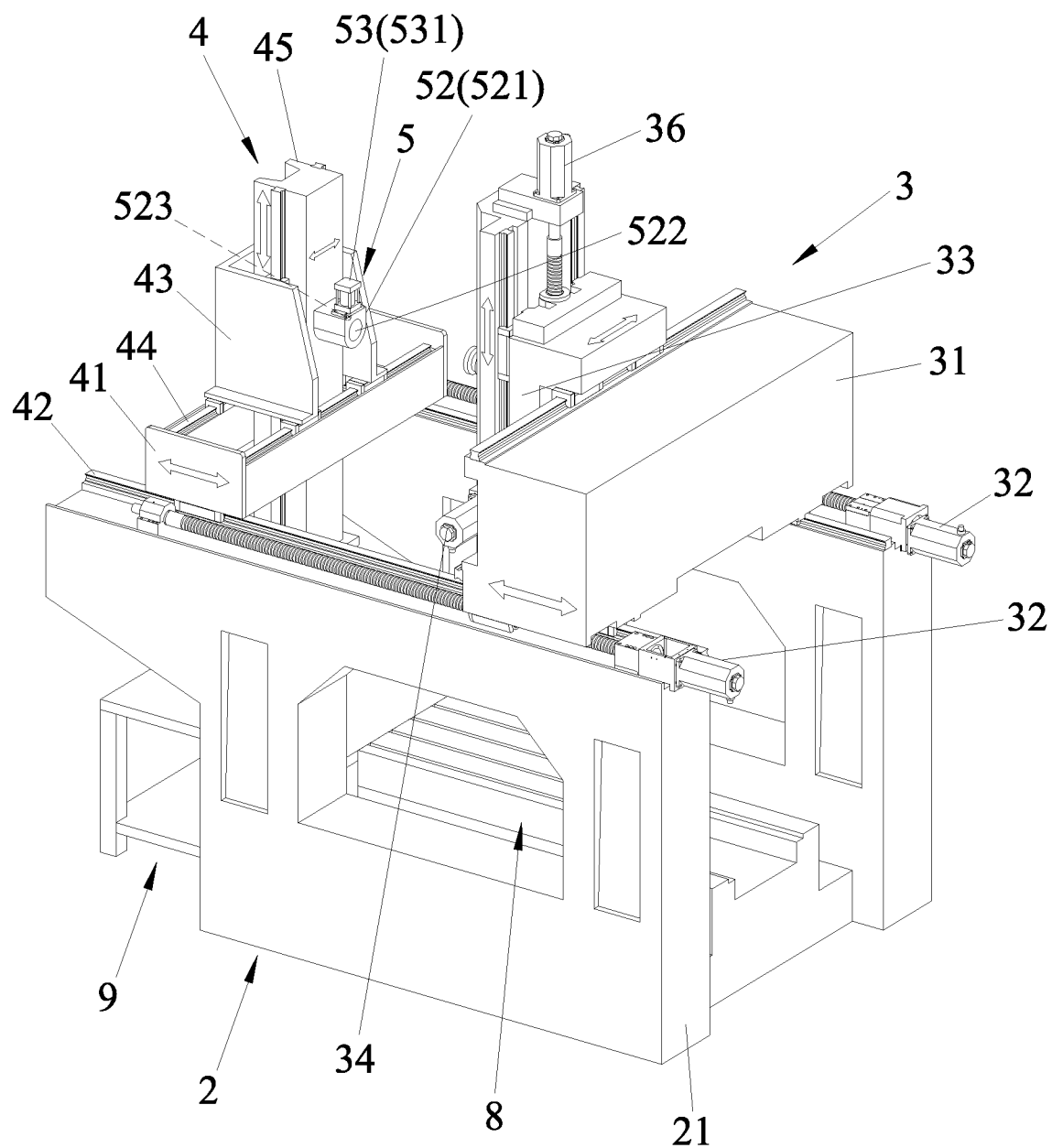
FIG. 3 is a perspective view, taken from a different angle, showing the first embodiment, the machining table, and the picking table.

Referring to FIGS. 1, 2, and 3, a CNC milling machine combined with picking robotic arm unit according to the first embodiment of the present invention comprises a chassis unit 2, a machining unit 3, a picking robotic arm unit 4, and a coupling unit 5.

An X-direction, a Y-direction, and a Z-direction that are mutually perpendicular to each other are defined as follows: the X-direction points in a front-rear direction; the Y-direction points in a left-right direction; and the Z-direction points in an up-down direction.

The chassis unit 2 comprises two vertical seats 21 that are spaced from each other in the Y-direction.

The machining unit 3 comprises a frontward-rearward movable machining seat 31 arranged on the vertical seats 21, two frontward-rearward driving sets 32 respectively arranged between the vertical seats 21 and the frontward-rearward movable machining seat 31 and operable to drive the frontward-rearward movable machining seat 31 to move in the X-direction, a leftward-rightward movable machining seat 33 arranged at a front side of the frontward-rearward movable machining seat 31, a leftward-rightward driving set 34 arranged between the leftward-rightward movable machining seat 33 and the frontward-rearward movable machining seat 31 to drive the leftward-rightward movable machining seat 33 to move in the Y-direction, an upward-downward movable machining seat 35 arranged at a front side of the leftward-rightward movable machining seat 33, an upward-downward machining driving set 36 arranged between the upward-downward movable machining seat 35 and the leftward-rightward movable machining seat 33 to drive the upward-downward movable machining seat 35 to move in the Z-direction, and a machining tool set 37 arranged at a bottom of the upward-downward movable machining seat 35. In the instant embodiment, the machining tool set 37 is operable to process a work piece to be processed (not shown) that is positioned on a machining table 8 arranged at a lower side. Since the structure of the machining tool set 37 is not a novel feature of this invention and is a known device of a regular CNC milling machine, further description will not be provided herein.

The picking robotic arm unit 4 comprises a frontward-rearward movable picking seat 41 located at a top side of the vertical seats 21 and located at a front side of the frontward-rearward movable machining seat 31, two frontward-rearward sliding sets 42 respectively arranged between the vertical seats 21 and the frontward-rearward movable picking seat 41 to allow the frontward-rearward movable picking seat 41 to move in the X-direction, a leftward-rightward movable picking seat 43 arranged at a top side of the frontward-rearward movable picking seat 41, a leftward-rightward sliding set 44 arranged between the leftward-rightward movable picking seat 43 and the frontward-rearward movable picking seat 41 to allow the leftward-rightward movable picking seat 43 to move in the Y-direction, an upward-downward movable picking seat 45 arranged adjacent to the leftward-rightward movable picking seat 43, an upward-downward sliding set 46 arranged between the upward-downward movable picking seat 45 and the leftward-rightward movable picking seat 43 to allow the upward-downward movable picking seat 45 to move in the Z-direction, and a claw set 47 arranged at a bottom of the upward-downward movable picking seat 45. In the instant embodiment, the claw set 47 is operable to pick a work piece to be processed that is positioned on a picking table 9 located on a lower side. Since the structure of the claw set 47 is not a novel feature of this invention and is a known device of a regular CNC milling machine, further description will not be provided herein.

Figure 4:
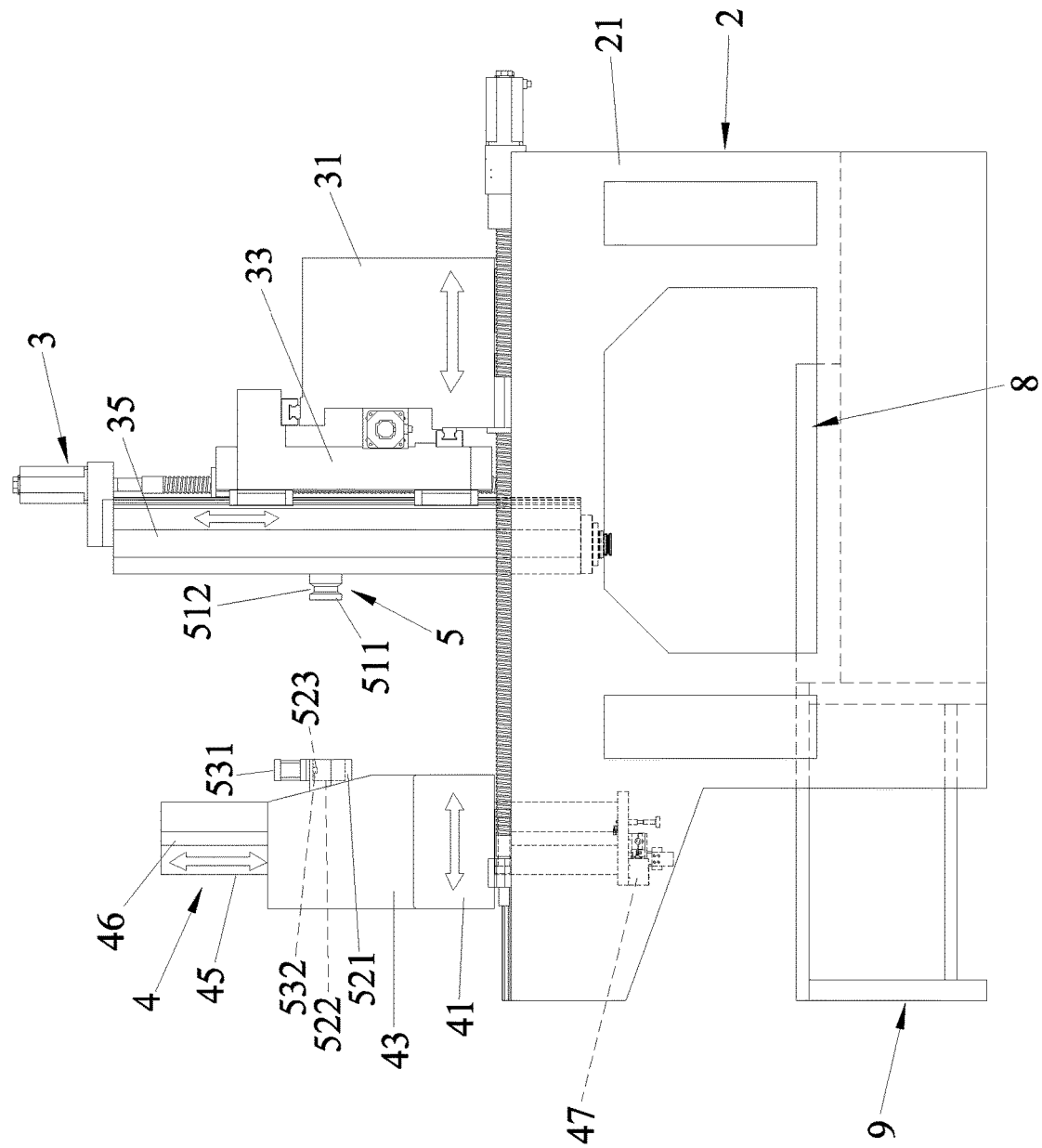
FIG. 4 is a side elevational view showing the first embodiment, the machining table, and the picking table, illustrating a condition where a machining tool set is removed.

Referring to FIGS. 2, 3, and 4, the coupling unit 5 comprises a first coupling member 51 arranged on the upward-downward movable machining seat 35 and extending frontward, a second coupling member 52 arranged on the picking robotic arm unit 4 and extending rearward, and a coupling driving set 53 that is drivable to couple the first coupling member 51 and the second coupling member 52.

The first coupling member 51 comprises a first post 511 arranged on the upward-downward movable machining seat 35 and extending frontward and a groove 512 circumferentially surrounding the first post 511.

The second coupling member 52 is arranged on the upward-downward movable picking seat 45 comprises a second post 521 arranged on the upward-downward movable picking seat 45 and extending rearward, a coupling slot 522 formed on one side of the second post 521 that is adjacent to the first post 511 to receive extension of the first post 511 therein, and an extension hole 523 formed in the second post 521 and in communication with the coupling slot 522.

The coupling driving set 53 comprises a driving member 531 arranged at an outside of the second post 521 and a retaining member 532 that is drivable by the driving member 531 to extend through the extension hole 523 and penetrate into the groove 512 to constrain the first post 511 and the second post 521 from separating from each other.

In the instant embodiment, the frontward-rearward driving sets 32, the leftward-rightward driving set 34, and the upward-downward machining driving set 36 are each structured as a combination of a lead screw and a servo motor. The frontward-rearward sliding sets 42, the leftward-rightward sliding set 44, and the upward-downward sliding set 46 are each structured as a combination of a rail and a slide. However, in other embodiments, the frontward-rearward driving sets 32 may comprise a linear motor. Since a combination of a lead screw and a servo motor, a combination of a rail and a slide, and a linear motor are all commonly known driver assembly, further description of structure details will not be provided herein.

To use, the machining unit 3 uses the frontward-rearward driving sets 32, the leftward-rightward driving set 34, and the upward-downward machining driving set 36 to drive the frontward-rearward movable machining seat 31, the leftward-rightward movable machining seat 33, and the upward-downward movable machining seat 35 to move so as to cause the machining tool set 37 to carry out a processing operation on the work piece to be processed in the Y-direction, the X-direction, and the Z-direction.

To move a work piece to be processed from the picking table 9 to the machining table 8 or to move an already-processed work piece back to the picking table 9, the machining tool set 37 is removed first and then the leftward-rightward movable machining seat 33 and the upward-downward movable machining seat 35 are moved to such a position where the first post 511 corresponds to and aligns with the coupling slot 522 of the second post 521 and the frontward-rearward movable machining seat 31 is driven to move frontward to have the first post 511 received into the coupling slot 522. The driving member 531 of the coupling driving set 53 carries out a driving operation to have the retaining member 532 penetrate into the coupling slot 522 so that the first post 511 and the second post 521 are coupled together and the machining unit 3 may drive the picking robotic arm unit 4 to move.

The upward-downward movable machining seat 35 of the machining unit 3, when driven to move in the Z-direction, drives the upward-downward movable picking seat 45 of the picking robotic arm unit 4 to move along the upward-downward sliding set 46 by means of the coupling unit 5 so as to drive the claw set 47 to move in the Z-direction.

The upward-downward movable machining seat 35 of the machining unit 3, when driven to move in the Y-direction, drives the upward-downward movable picking seat 45 and the leftward-rightward movable picking seat 43 of the picking robotic arm unit 4 to move along the leftward-rightward sliding set 44 by means of the coupling unit 5 so as to drive the claw set 47 to move in the Y-direction.

The upward-downward movable machining seat 35 of the machining unit 3, when driven to move in the X-direction, drives the upward-downward movable picking seat 45, the leftward-rightward movable picking seat 43, and the frontward-rearward movable picking seat 41 of the picking robotic arm unit 4 to move along the frontward-rearward sliding sets 42 by means of the coupling unit 5 so as to drive the claw set 47 to move in the X-direction.

Figure 5:
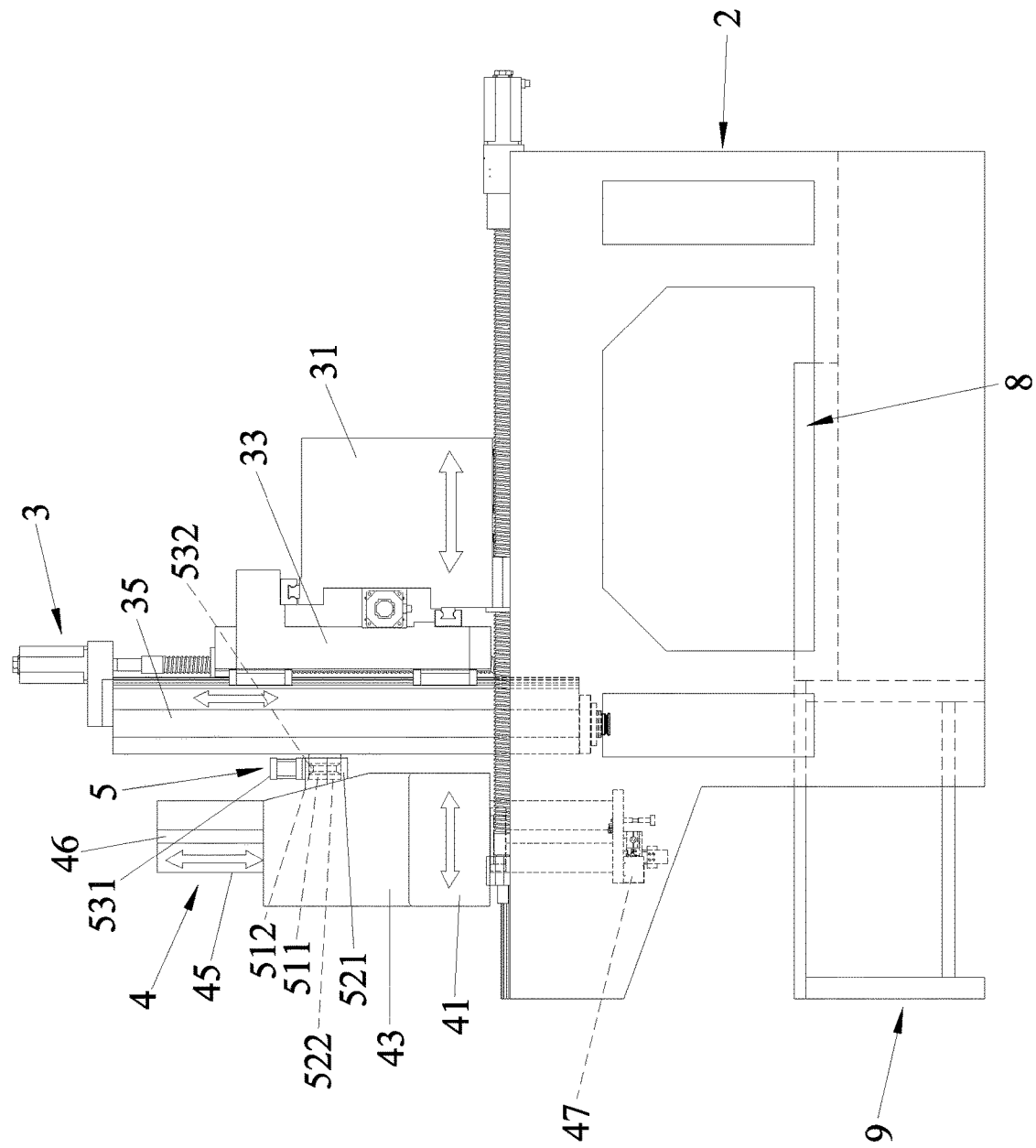
FIG. 5 is a view similar to FIG. 4, illustrating a machining unit being coupled, toward a front side thereof, to a picking robotic arm unit.
Figure 6:
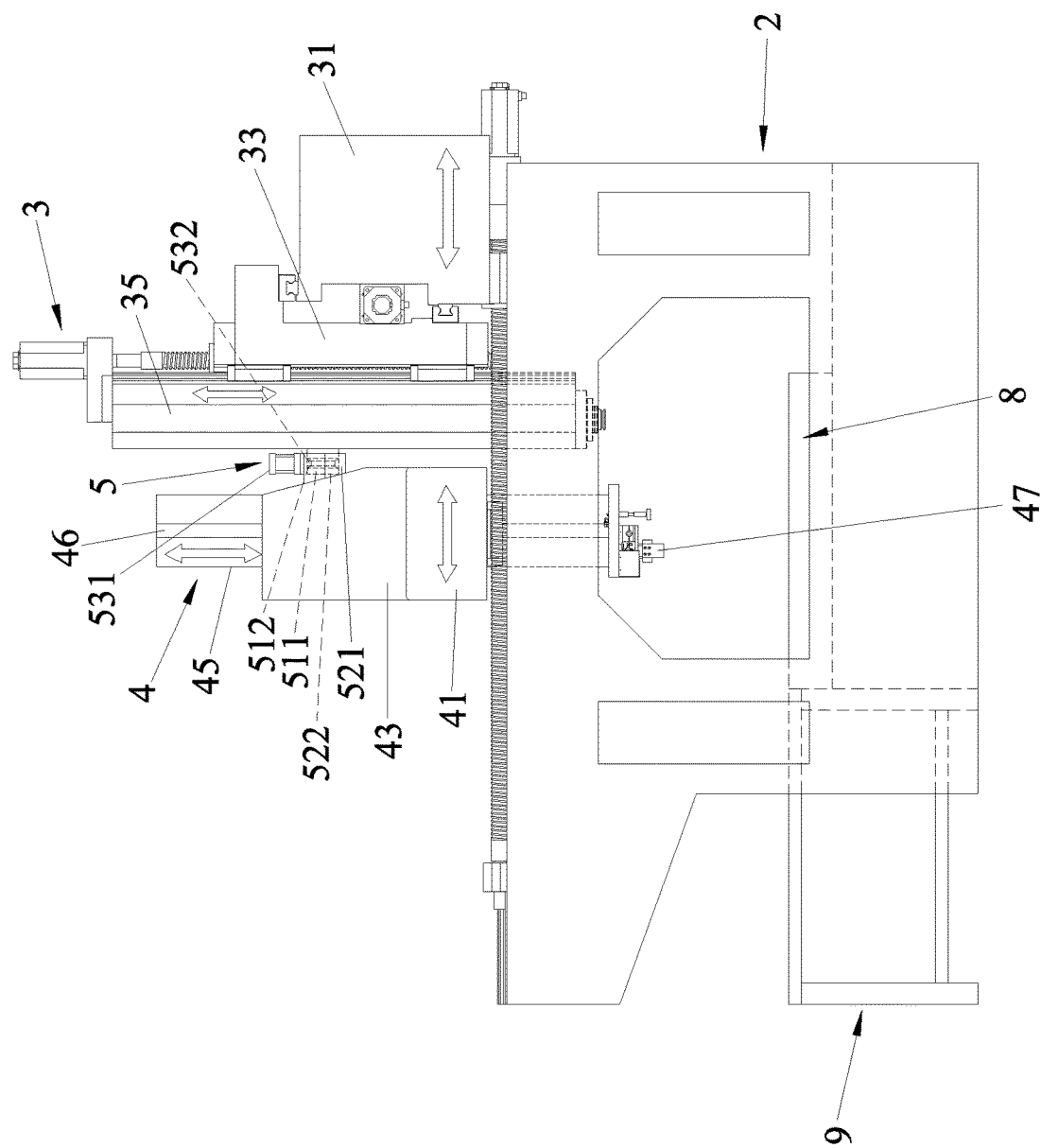
FIG. 6 is a view similar to FIG. 5, illustrating the machining unit pulling the picking robotic arm unit in a rearward direction.
Figure 7:
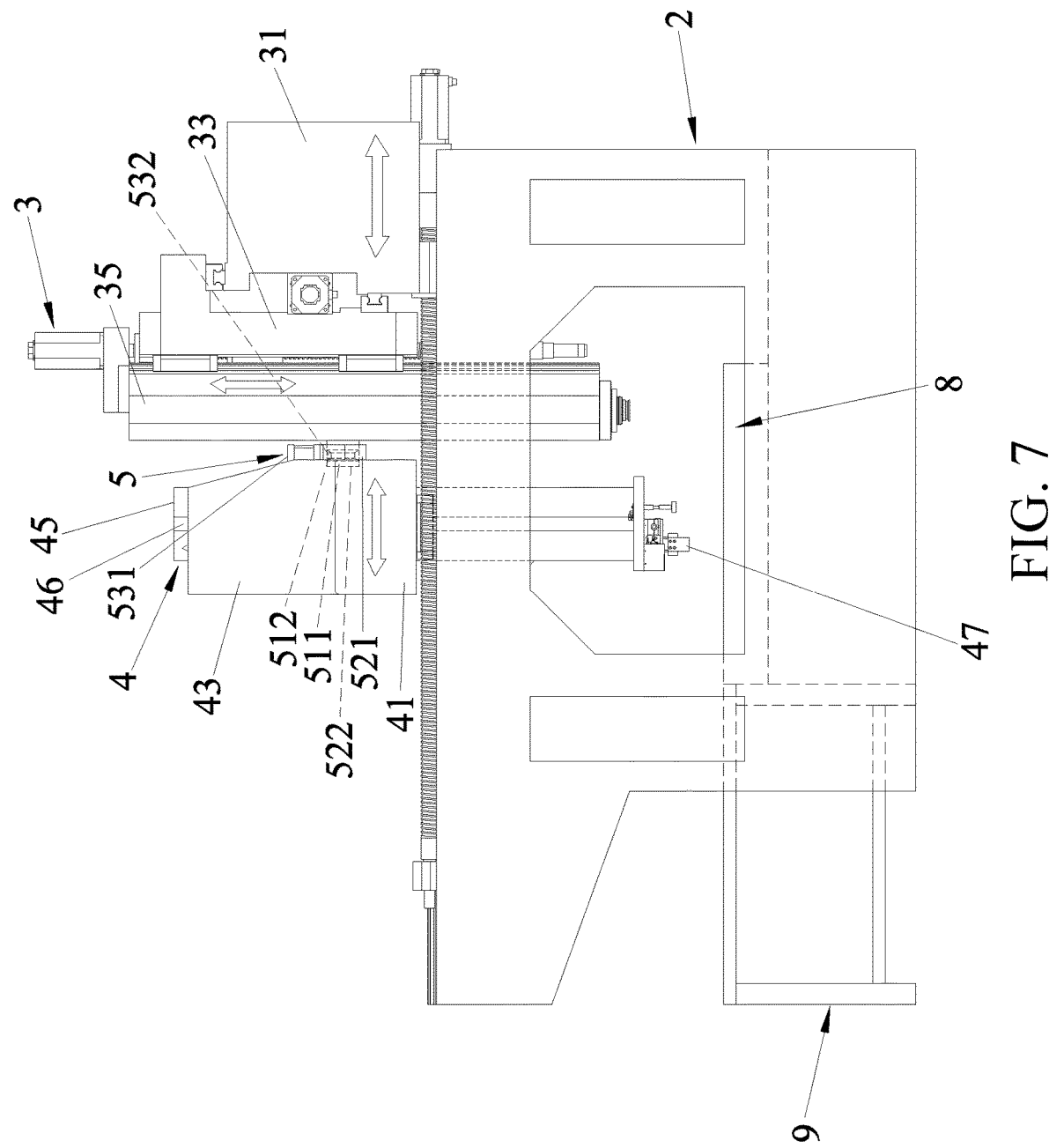
FIG. 7 is a view similar to FIG. 6, illustrating the machining unit pulling the picking robotic arm unit in a downward direction.

In a process of moving a work piece to be processed from the picking table 9 to the machining table 8, the machining tool set 37 is removed first (see FIG. 4), and then the machining unit 3 moves frontward to a location adjacent to the picking robotic arm unit 4 to allow the coupling unit 5 to carry out coupling (see FIG. 5), so that the claw set 47 is allowed to move downward for gripping and picking up the work piece to be processed that is located on the picking table 9 and is then moved upward and subsequently moved rearward to reach a position above the machining table 8 (see FIG. 6), following by downward movement again to allow the claw set 47 to place the work piece to be processed on the machining table 8 (see FIG. 7).

Referring to FIGS. 2 and 3, it is noted that the picking robotic arm unit 4 may further comprises three brake assemblies (not shown) respectively arranged on the frontward-rearward sliding sets 42, the leftward-rightward sliding set 44, and the upward-downward sliding set 46. When the picking robotic arm unit 4 is located at a coupling reference position for receiving the first post 511 to extend therein, the brake assemblies function to constrain the frontward-rearward movable picking seat 41, the leftward-rightward movable picking seat 43, and the upward-downward movable picking seat 45 from deviating in position and allowing for movement only when driven by a relatively large driving power of the machining unit 3.

Similarly, moving a work piece from the machining table 8 to the picking table 9 following the same process, except that the moving direction is different. Repeated description of the operation process is omitted herein.

In this way, since the picking robotic arm unit 4 is combinable with the machining unit 3 by means of the coupling unit 5 and is drivable by the machining unit 3 to move in the Y-direction, the X-direction, and the Z-direction. Compared to the picking robotic arm unit of an existing CNC milling machine, which requires three servo motors to carry out an operation of gripping and picking up a work piece, the CNC milling machine combined with picking robotic arm unit according to the present invention allows the picking robotic arm unit 4 to carry out gripping and picking up operations without servo motor provided for a power portion thereof, so that the cost can be greatly reduced.

Figure 8:
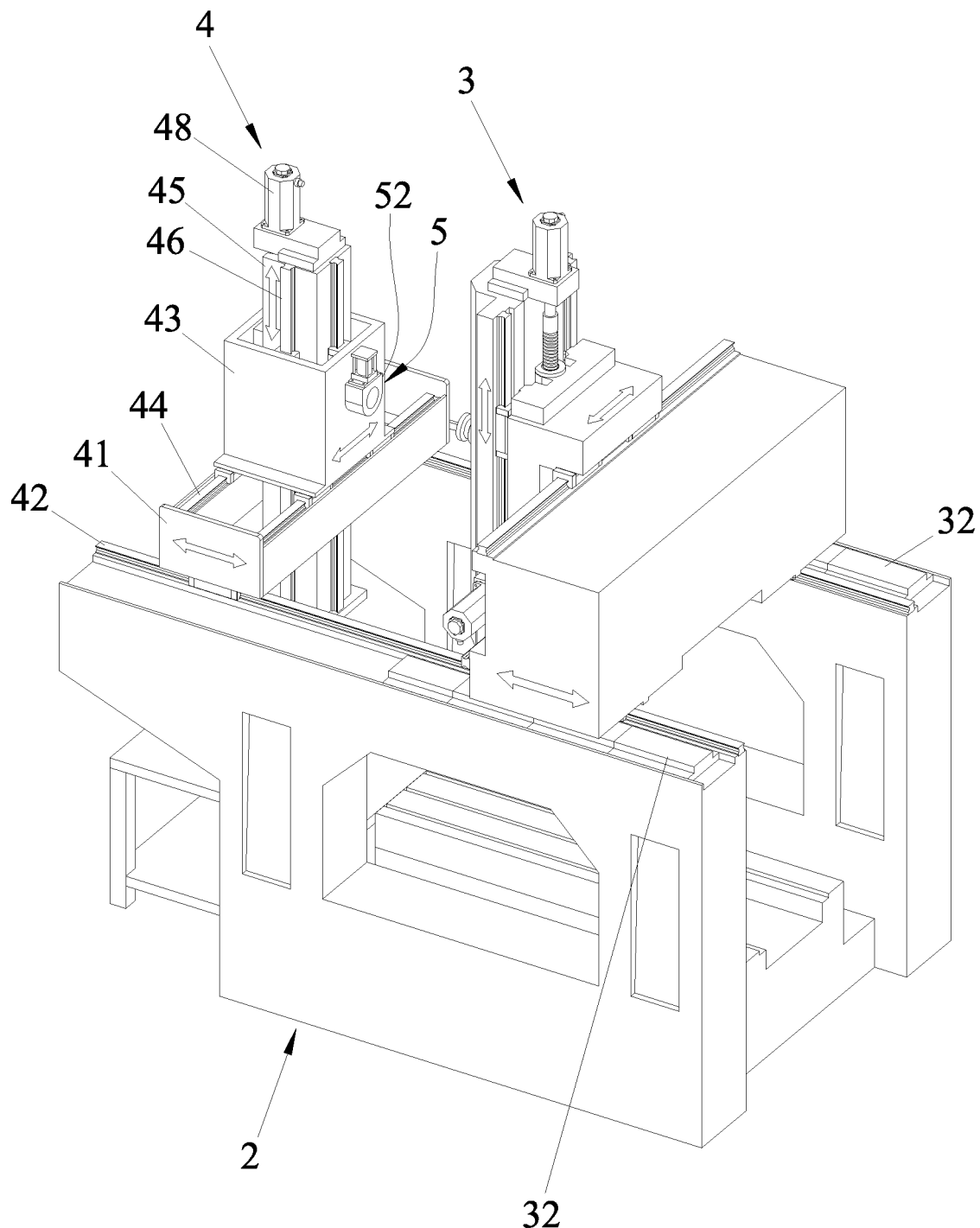
FIG. 8 is a perspective view, taken at the same angle as FIG. 3, showing a CNC milling machine combined with a picking robotic arm unit according to a second embodiment the present invention, a machining table, and a picking table.
Figure 9:
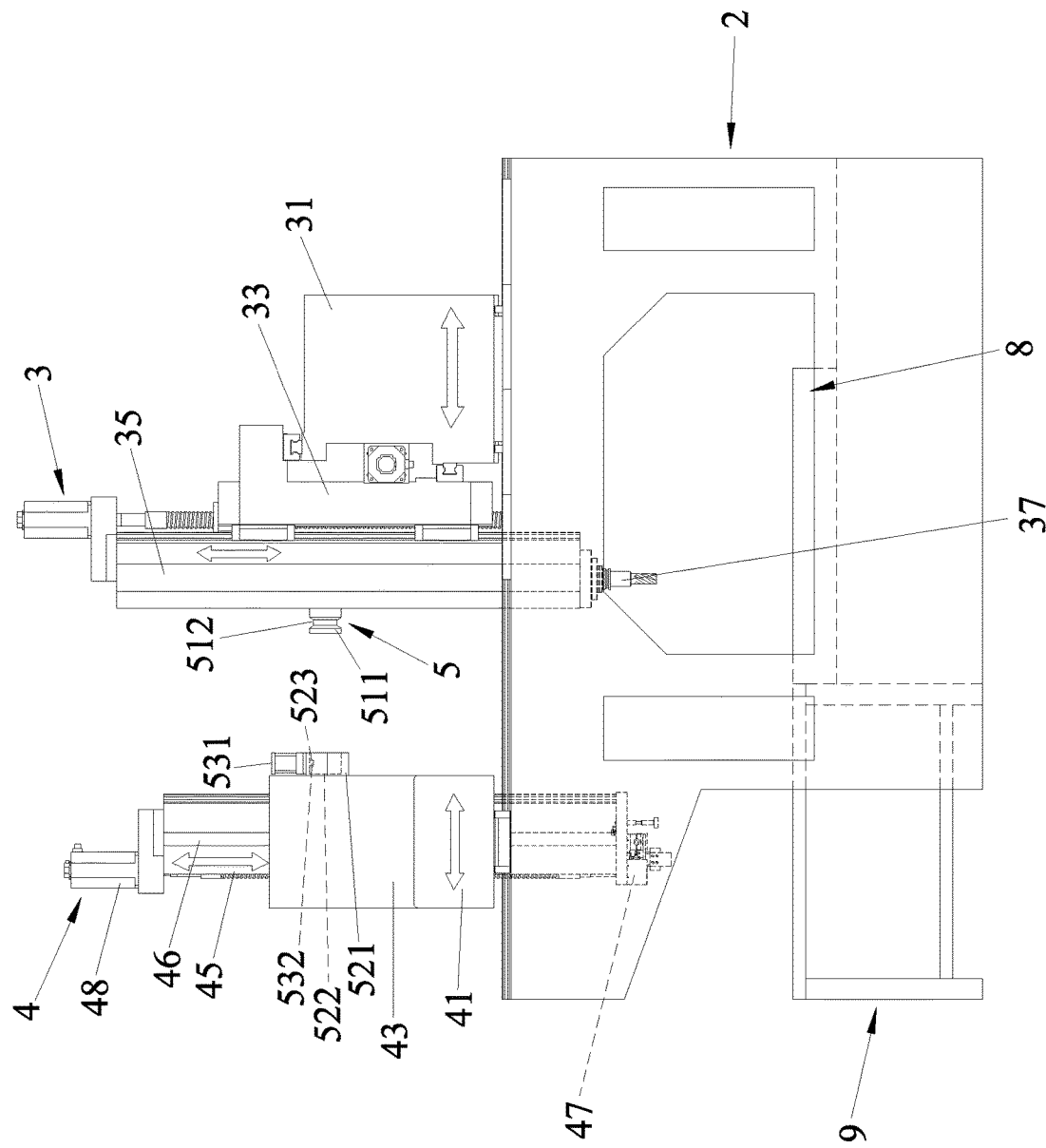
FIG. 9 is a perspective view, taken at the same angle as FIG. 4, showing the second embodiment the present invention, the machining table, and the picking table.
Figure 10:
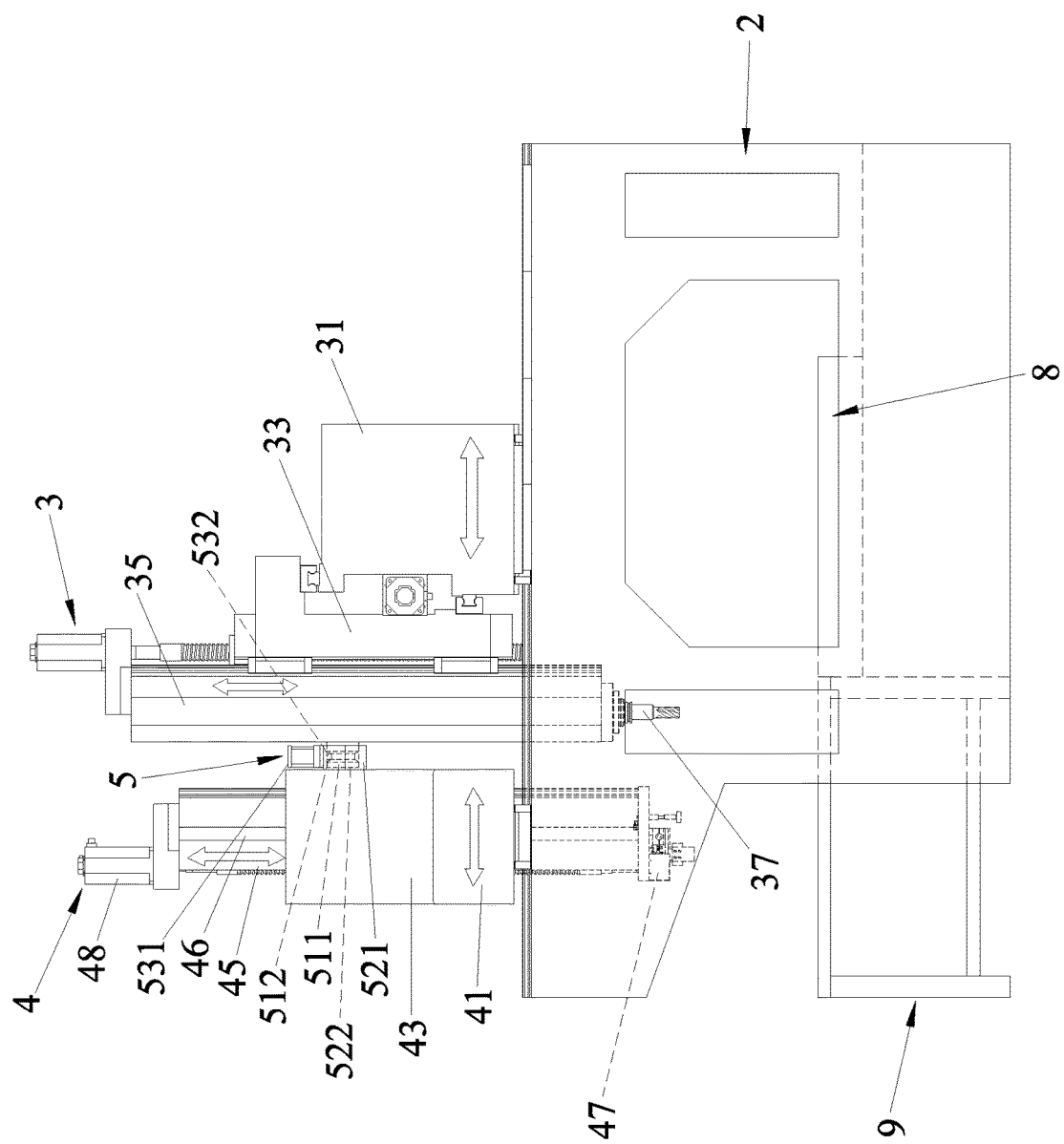
FIG. 10 is a view similar to FIG. 9, illustrating a machining unit being coupled, toward a front side thereof, to a picking robotic arm unit.

Referring to FIGS. 8, 9, and 10, the present invention provides a second embodiment that is generally similar to the first embodiment, with differences therebetween being as follows:

The frontward-rearward driving sets 32 each comprise a linear motor.

The second coupling member 52 is arranged on the leftward-rightward movable picking seat 43, and the second post 521 is arranged on the leftward-rightward movable picking seat 43 and extends rearward.

The picking robotic arm unit 4 further comprises an upward-downward picking driving set 48 that is arranged to drive the upward-downward sliding set 46 to move so as to have the upward-downward movable picking seat 45 to move in the Z-direction. In the instant embodiment, the upward-downward picking driving set 48 comprises a combination of a lead screw and a servo motor.

The picking robotic arm unit 4 comprises two brake assemblies (not shown) respectively arranged on the frontward-rearward sliding sets 42 and the leftward-rightward sliding set 44.

Figure 11:
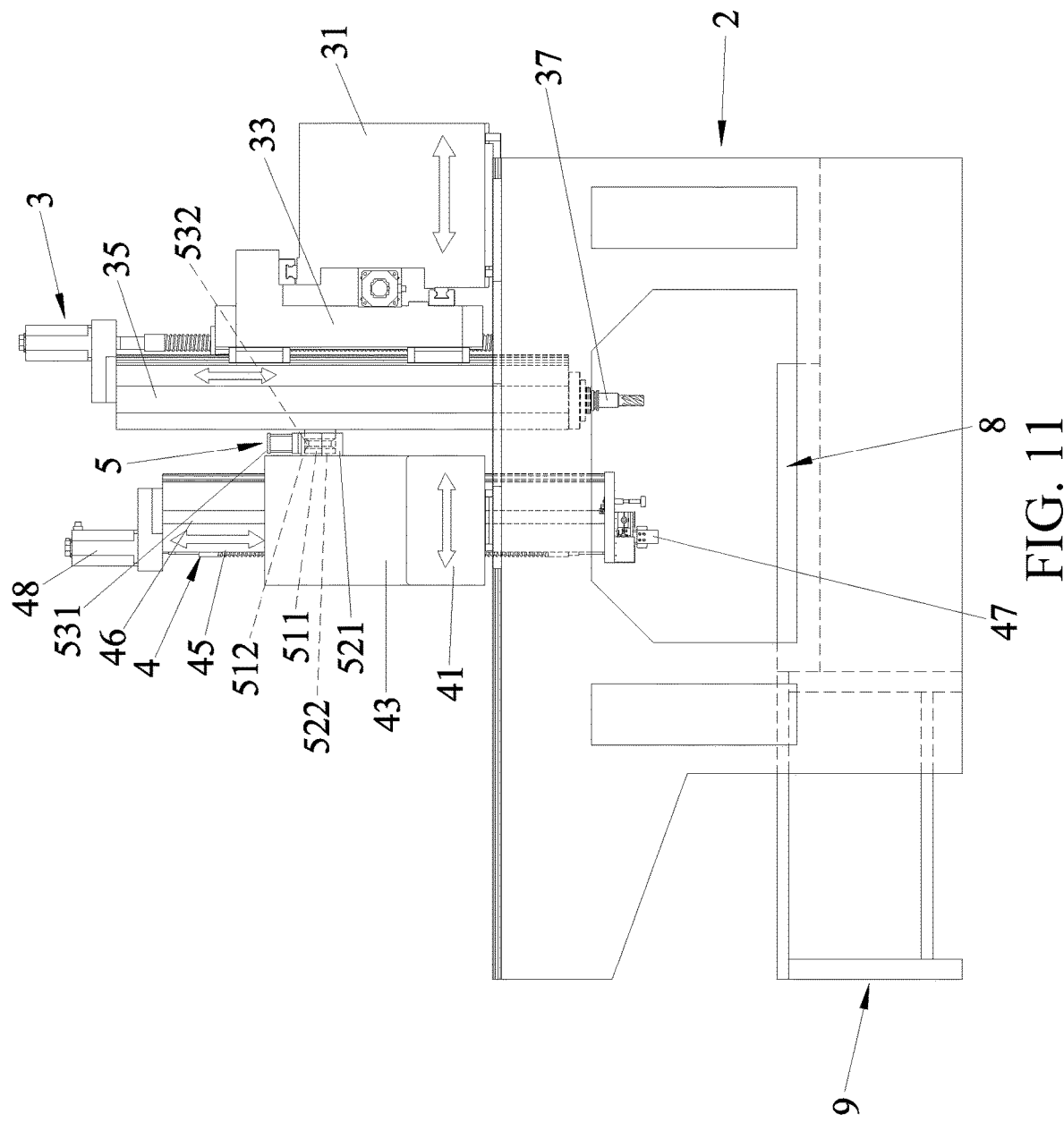
FIG. 11 is a view similar to FIG. 10, illustrating the machining unit pulling the picking robotic arm unit in a rearward direction.

Similar to the first embodiment, in the second embodiment, the machining unit 3 uses the coupling unit 5 to couple with the leftward-rightward movable picking seat 43 (see FIG. 10) and to drive the frontward-rearward movable picking seat 41 and the leftward-rightward movable picking seat 43 to respectively move in the X-direction and the Y-direction (see FIG. 11) by means of uses the coupling unit 5.

Figure 12:
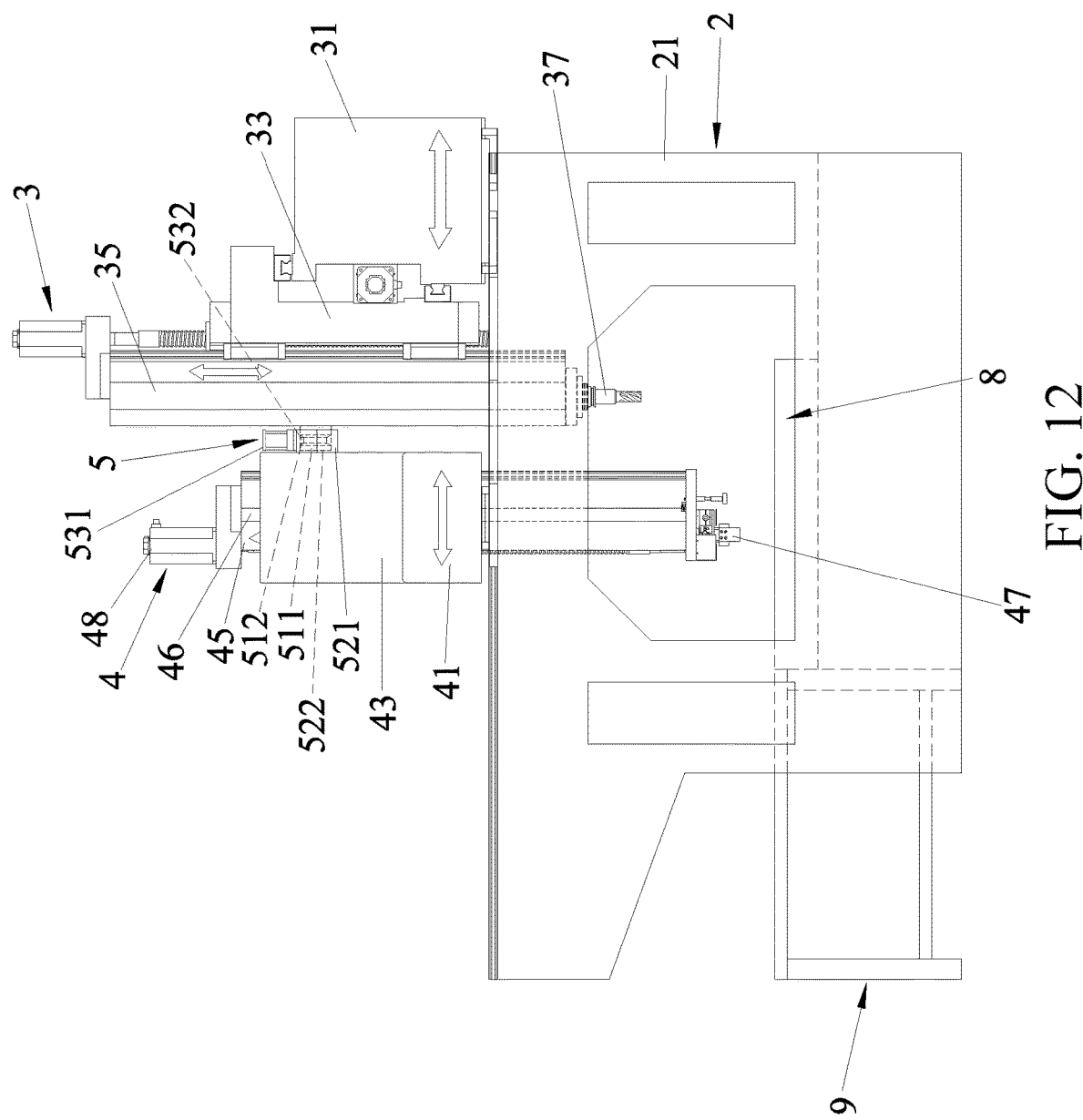
FIG. 12 is a view similar to FIG. 11, illustrating an upward-downward picking driving set driving a claw set to move downward.

Referring to FIGS. 8 and 12, the movement of the upward-downward movable picking seat 45 is achieved by having the upward-downward driving seat 48 drives the upward-downward sliding set 46. In this way, the upward-downward driving seat 48 is allowed to carry the upward-downward movable picking seat 45 and the claw set 47 only, so that stability is enhanced and removal of the machining tool set 37 during use is not necessary to thereby improve easiness of use.

Thus, compared to the picking robotic arm unit of an existing CNC milling machine, which requires three servo motors to carry out an operation of gripping and picking up a work piece, the CNC milling machine combined with picking robotic arm unit according to the present invention allows the picking robotic arm unit 4 to carry out gripping and picking up operations with only the upward-downward driving seat 48 arranged as a power portion thereof, so that the cost can be greatly reduced.

It is noted that in other embodiments, the picking robotic arm unit 4 may further comprises a frontward-rearward picking driving set (not shown) that is arranged to drive the frontward-rearward sliding sets 42 to move so as to have the frontward-rearward movable picking seat 41 moved in the X-direction. Through driving provided by the frontward-rearward picking driving set, the frontward-rearward movable picking seat 41 is also driven to move rearward so as to reduce the time for coupling between the machining unit 3 and the picking robotic arm unit 4.

As such, the second embodiment achieve the same purposes and effects as those of the first embodiment described above.

In summary, by arranging the machining unit 3 and the picking robotic arm unit 4 on the vertical seats 21 and using the coupling unit 5 to achieve coupling therebetween, the picking robotic arm unit 4 is selectively drivable by the machining unit 3 to move so that the cost can be reduced to achieve the purposes of this invention.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A computer numeric control (CNC) milling machine combinable with a picking robotic arm unit, comprising:
    a chassis unit, in which an X-direction, a Y-direction and a Z-direction mutually perpendicular to each other are defined, wherein the X-direction is a front-rear direction; the Y-direction is a left-right direction; and the Z-direction is an up-down direction, the chassis unit comprising two vertical seats spaced from each other in the Y-direction;
    a machining unit, which comprises a frontward-rearward movable machining seat arranged on the vertical seats, two frontward-rearward driving sets respectively arranged between the vertical seats and the frontward-rearward movable machining seat and operable to drive the frontward-rearward movable machining seat to move in the X-direction, a leftward-rightward movable machining seat arranged at a front side of the frontward-rearward movable machining seat, a leftward-rightward driving set arranged between the leftward-rightward movable machining seat and the frontward-rearward movable machining seat to drive the leftward-rightward movable machining seat to move in the Y-direction, an upward-downward movable machining seat arranged at a front side of the leftward-rightward movable machining seat, an upward-downward machining driving set arranged between the upward-downward movable machining seat and the leftward-rightward movable machining seat to drive the upward-downward movable machining seat to move in the Z-direction, and a machining tool set arranged at a bottom of the upward-downward movable machining seat;
    the picking robotic arm unit, which comprises a frontward-rearward movable picking seat located at a top side of the vertical seats and located at a front side of the frontward-rearward movable machining seat, two frontward-rearward sliding sets respectively arranged between the vertical seats and the frontward-rearward movable picking seat to allow the frontward-rearward movable picking seat to move in the X-direction, a leftward-rightward movable picking seat arranged at a top side of the frontward-rearward movable picking seat, a leftward-rightward sliding set arranged between the leftward-rightward movable picking seat and the frontward-rearward movable picking seat to allow the leftward-rightward movable picking seat to move in the Y-direction, an upward-downward movable picking seat arranged adjacent to the leftward-rightward movable picking seat, an upward-downward sliding set arranged between the upward-downward movable picking seat and the leftward-rightward movable picking seat to allow the upward-downward movable picking seat to move in the Z-direction, and a claw set arranged at a bottom of the upward-downward movable picking seat; and
    a coupling unit, which comprises a first coupling member arranged on the upward-downward movable machining seat and extending frontward, a second coupling member arranged on the picking robotic arm unit and extending rearward, and a coupling driving set that is drivable to couple the first coupling member and the second coupling member, wherein the machining unit uses the coupling unit to drive the leftward-rightward movable picking seat and the frontward-rearward movable picking seat to move.

2. The CNC milling machine combined with picking robotic arm unit according to claim 1, wherein the second coupling member is arranged on the upward-downward movable picking seat, and the machining unit uses the coupling unit to drive the leftward-rightward movable picking seat, the frontward-rearward movable picking seat, and the upward-downward movable picking seat to move.

3. The CNC milling machine combined with picking robotic arm unit according to claim 2, wherein the first coupling member comprises a first post arranged on the upward-downward movable machining seat and extending frontward and a groove circumferentially surrounding the first post; the second coupling member comprises a second post arranged on the upward-downward movable picking seat and extending rearward, a coupling slot formed on one side of the second post that is adjacent to the first post to receive extension of the first post therein, and an extension hole formed in the second post and in communication with the coupling slot; and the coupling driving set comprises a driving member arranged at an outside of the second post and a retaining member that is drivable by the driving member to extend through the extension hole and penetrate into the groove to constrain the first post and the second post from separating from each other.

4. The CNC milling machine combined with picking robotic arm unit according to claim 2, wherein the frontward-rearward driving sets, the leftward-rightward driving set, and the upward-downward machining driving set each comprises a combination of a lead screw and a servo motor, and the frontward-rearward sliding sets, the leftward-rightward sliding set, and the upward-downward sliding set each comprise a combination of a rail and a slide.

5. The CNC milling machine combined with picking robotic arm unit according to claim 2, wherein the frontward-rearward driving sets each comprise a linear motor; the leftward-rightward driving set and the upward-downward machining driving set each comprise a combination of a lead screw and a servo motor; and the frontward-rearward sliding sets, the leftward-rightward sliding set, and the upward-downward sliding set each comprise a combination of a rail and a slide.

6. The CNC milling machine combined with picking robotic arm unit according to claim 1, wherein the second coupling member is arranged on the leftward-rightward movable picking seat, and the picking robotic arm unit further comprises an upward-downward picking driving set that is arranged to drive the upward-downward sliding set to move so as to have the upward-downward movable picking seat to move in the Z-direction.

7. The CNC milling machine combined with picking robotic arm unit according to claim 6, wherein the first coupling member comprises a first post arranged on the upward-downward movable machining seat and extending frontward and a groove circumferentially surrounding the first post; the second coupling member comprises a second post arranged on the leftward-rightward movable picking seat and extends rearward, a coupling slot formed on one side of the second post that is adjacent to the first post to receive extension of the first post therein, and an extension hole formed in the second post and in communication with the coupling slot; and the coupling driving set comprises a driving member arranged at an outside of the second post and a retaining member that is drivable by the driving member to extend through the extension hole and penetrate into the groove to constrain the first post and the second post from separating from each other.

8. The CNC milling machine combined with picking robotic arm unit according to claim 6, wherein the frontward-rearward driving sets, the leftward-rightward driving set, and the upward-downward machining driving set each comprise a combination of a lead screw and a servo motor, and the frontward-rearward sliding sets, the leftward-rightward sliding set, and the upward-downward sliding set each comprise a combination of a rail and a slide.

9. The CNC milling machine combined with picking robotic arm unit according to claim 6, wherein the frontward-rearward driving sets each comprise a linear motor; the leftward-rightward driving set and the upward-downward machining driving set each comprise a combination of a lead screw and a servo motor; and the frontward-rearward sliding sets, the leftward-rightward sliding set, and the upward-downward sliding set each comprise a combination of a rail and a slide.

* * * * *